United States Patent
Goto et al.

(10) Patent No.: US 12,330,133 B2
(45) Date of Patent: Jun. 17, 2025

(54) EXHAUST GAS PURIFYING COMPOSITION AND PRODUCTION METHOD THEREFOR

(71) Applicant: Mitsui Mining & Smelting Co., Ltd., Tokyo (JP)

(72) Inventors: Hidekazu Goto, Saitama (JP); Jo Nishikawa, Saitama (JP); Mayuko Suwa, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 589 days.

(21) Appl. No.: 17/629,217

(22) PCT Filed: Jun. 5, 2020

(86) PCT No.: PCT/JP2020/022264
§ 371 (c)(1),
(2) Date: Jan. 21, 2022

(87) PCT Pub. No.: WO2021/044687
PCT Pub. Date: Mar. 11, 2021

(65) Prior Publication Data
US 2022/0258123 A1    Aug. 18, 2022

(30) Foreign Application Priority Data
Sep. 5, 2019  (JP) ................. 2019-161816

(51) Int. Cl.
*B01J 20/18* (2006.01)
*B01D 53/92* (2006.01)
(Continued)

(52) U.S. Cl.
CPC .............. *B01J 20/18* (2013.01); *B01D 53/92* (2013.01); *B01J 20/28069* (2013.01);
(Continued)

(58) Field of Classification Search
CPC .. B01J 20/18; B01J 20/28069; B01J 20/2808; B01J 20/28083; B01J 20/3078; B01D 2258/01; B01D 53/92
(Continued)

(56) References Cited

U.S. PATENT DOCUMENTS 8,821,714 B2 *  9/2014  Chaumonnot ......... C10G 65/12
                                                      208/57
9,150,486 B2 * 10/2015  Geboers ................... B01J 29/74
(Continued)

FOREIGN PATENT DOCUMENTS

CA     2818480 A1 *  5/2012  .............. B01J 29/10
CN   104321280 A      1/2015
(Continued)

OTHER PUBLICATIONS

CN-109219482-A (Year: 2019).*
(Continued)

*Primary Examiner* — Cam N. Nguyen
(74) *Attorney, Agent, or Firm* — RANKIN, HILL & CLARK LLP (57) ABSTRACT

An exhaust gas purifying composition that contains a phosphorus-containing BEA-type zeolite and has further improved heat resistance; and a production method therefor are provided. The exhaust gas purifying composition contains a phosphorus-containing BEA-type zeolite, wherein the phosphorus-containing BEA-type zeolite has a pore volume ratio (V2/V1) of a micropore volume V2 having a pore diameter in a range of 2 nm or less, as measured by a SF method, to a mesopore volume V1 having a pore diameter in a range of 2 nm or more and 100 nm or less, as measured by a BJH method, of 2.0 or more.

9 Claims, 1 Drawing Sheet

(51) Int. Cl.
*B01J 20/28* (2006.01)
*B01J 20/30* (2006.01)

(52) U.S. Cl.
CPC ..... *B01J 20/2808* (2013.01); *B01J 20/28083* (2013.01); *B01J 20/3078* (2013.01); *B01D 2258/01* (2013.01)

(58) Field of Classification Search
USPC .......................................................... 502/407
See application file for complete search history.

(56) References Cited

U.S. PATENT DOCUMENTS

| | | | |
|---|---|---|---|
| 10,434,502 B2 * | 10/2019 | Nishikawa | ........... B01J 23/6482 |
| 11,498,062 B2 * | 11/2022 | Cho | ........................ B01J 29/85 |
| 2014/0186251 A1 | 7/2014 | Tissler et al. | |
| 2015/0086786 A1 | 3/2015 | Tabashi et al. | |
| 2019/0083965 A1 | 3/2019 | Nishikawa et al. | |

FOREIGN PATENT DOCUMENTS

| | | |
|---|---|---|
| CN | 108698034 A | 10/2018 |
| JP | 11-226425 A | 8/1999 |
| JP | 2012-239924 A | 12/2012 |
| JP | 2013-234109 A | 11/2013 |
| JP | 2014-519970 A | 8/2014 |
| WO | 2018/131195 A1 | 7/2018 |

OTHER PUBLICATIONS

WO-2009153421-A1 (Year: 2009).*
International Search Report (ISR) dated Aug. 18, 2020 filed in PCT/JP2020/022264.

* cited by examiner

EXHAUST GAS PURIFYING COMPOSITION AND PRODUCTION METHOD THEREFOR

CROSS-REFERENCE TO RELATED APPLICATIONS

This application is a National Phase Application of International Application No. PCT/JP2020/022264, filed Jun. 5, 2020, which claims the priority of Japan Patent Application No. 2019-161816, filed Sep. 5, 2019. The present application claims priority from both applications and each of these applications is herein incorporated in their entirety by reference.

TECHNICAL FIELD

The present invention relates to an exhaust gas purifying composition containing zeolite and a production method therefor.

BACKGROUND ART

Exhaust gases emitted from internal combustion engines such as gasoline engines and diesel engines of automatic four-wheel vehicles and motorcycles (also referred to as saddle-riding-type vehicles) contain harmful components such as hydrocarbons (HC) due to unburned fuel, carbon monoxide (CO) due to incomplete combustion, and nitrogen oxides (NOx) due to excessive combustion temperature. In order to treat the exhaust gases emitted from the internal combustion engines, an exhaust gas purifying composition used for an exhaust gas purifying catalyst has been used. For example, hydrocarbons (HC) contained in the exhaust gases are oxidized and converted into water and carbon dioxide for purification. Carbon monoxide (CO) is oxidized and converted into carbon dioxide for purification. Nitrogen oxides (NOx) are reduced and converted into nitrogen for purification. Purification of hydrocarbons (HC) by a catalyst is strongly influenced by the exhaust gas temperature, and generally requires a high temperature of 300° C. or higher. When the exhaust gas temperature is low immediately after the start-up of an internal combustion engine, hydrocarbons (HC) are less likely to be purified by a catalyst, and the hydrocarbons (HC) are likely to be emitted immediately after the start-up of the internal combustion engine. For this reason, there is a need for an exhaust gas purifying composition capable of adsorbing hydrocarbons (HC) immediately after the start-up of an internal combustion engine, and releasing and purifying the hydrocarbons (HC) when the exhaust gas temperature reaches at 300° C. or higher and the catalyst is activated.

For example, Patent Document 1 discloses a method for activating a zeolite catalyst containing Group 11 elements in the periodic table and phosphorus. However, the technique described in Patent Document 1 decomposes hexane at a temperature of 550° C., which may cause a problem in durability for purifying exhaust gases also used in a high temperature range of 900° C. to 1,100° C. Patent document 2 discloses an exhaust gas purifying composition containing a phosphorus-containing BEA-type zeolite, which enables the BEA-type zeolite to maintain its structure even under severe thermal environments.

CITATION LIST

Patent Document

Patent Literature 1: Japanese Patent Laid-open 2012-239924

Patent literature 2: International Patent Publication WO 2018/131195

SUMMARY OF THE INVENTION

Problem to be Solved by the Invention

The BEA-type zeolite has excellent adsorption capacity for hydrocarbons (HC), and there is a need to further improve the heat resistance in severe thermal environments.

Thus, the present invention is to provide an exhaust gas purifying composition that contains a phosphorus-containing BEA-type zeolite and has further improved heat resistance, which can be used even in severe thermal environments, and a production method therefor.

Means for Solving Problem

The present invention proposes an exhaust gas purifying composition containing a phosphorus-containing BEA-type zeolite. The phosphorus-containing BEA-type zeolite has a pore volume ratio (V2/V1) of a micropore volume V2 to a mesopore volume V1 of 2.0 or more, wherein the micropore volume V2 has a pore diameter in a range of 2 nm or less as measured by a Saito-Foley (SF) method, and the mesopore volume V1 has a pore diameter in a range of 2 nm or more and 100 nm or less as measured by a Barrett-Joyner-Halenda (BJH) method.

The present invention also proposes a production method for an exhaust gas purifying composition containing a phosphorus-containing BEA-type zeolite.

The production method includes:
- a step of preparing a BEA-type zeolite having a pore volume ratio (V2/V1) of a micropore volume V2 to a mesopore volume V1 of 1.8 or more;
- a step of bringing the BEA-type zeolite into contact with a phosphorus-containing compound to attach the phosphorus-containing compound to the BEA-type zeolite; and
- a step of heat-treating the BEA-type zeolite containing the phosphorus-containing compound to obtain a phosphorus-containing BEA-type zeolite,
- wherein the micropore volume V2 has a pore diameter in a range of 2 nm or less as measured by the SF method, and the mesopore volume V1 has a pore diameter in a range of 2 nm or more and 100 nm or less as measured by the BJH method.

Effect of the Invention

The present invention provides an exhaust gas purifying composition containing a phosphorus-containing BEA-type zeolite having reduced mesopores that cause defects in the framework structure in severe thermal environments, and having further improved heat resistance.

MODE(S) FOR CARRYING OUT THE INVENTION

Next, the present invention will be described based on exemplary embodiments. However, the present invention is not limited to the embodiments described below.

An example of the embodiments of the present invention is an exhaust gas purifying composition containing a phosphorus-containing BEA-type zeolite. The phosphorus-containing BEA-type zeolite has a pore volume ratio (V2/V1) of a micropore volume V2 to a mesopore volume V1 of 2.0 or more, wherein the micropore volume V2 has a pore diameter in a range of 2 nm or less as measured by a Saito-Foley (SF) method, and the mesopore volume V1 has a pore diameter in a range of 2 nm or more and 100 nm or less as measured by a Barrett-Joyner-Halenda (BJH) method. The micropore volume V2 is, specifically, a micropore volume having a pore diameter in a range of 0 nm or more and 2 nm or less, as measured by the SF method described in detail later.

The zeolite refers to a crystalline material in which $TO_4$ units (T represents a central atom) having a tetrahedral structure are three-dimensionally connected by sharing oxygen (O) atoms to form opened regular micropores. Specifically, examples of the zeolite include silicates, germanium salts, and arsenates described in the Structural Committee Data Collection of the International Zeolite Association (hereinafter, also referred to as "IZA").

Examples of the silicates include aluminosilicates, gallosilicates, ferricates, titanosilicates, and borosilicates. Examples of the germanium salts include aluminogermanium salts. Examples of the arsenates include aluminoarsenates. Examples of the aluminosilicates used as zeolites include those in which a part of Si or Al in the framework is replaced with divalent or trivalent cations of Ti, Ga, Mg, Mn, Fe, Co, Zn, and the like. The zeolite preferably uses a zeolite containing crystalline aluminosilicate.

The zeolite contained in the exhaust gas purifying composition preferably includes a BEA-type zeolite. The framework structure of the zeolite is databased by IZA. The BEA-type zeolite includes mesopores having a pore diameter in a range of 2 nm or more and 100 nm or less, as measured by the BJH method, and micropores having a pore diameter in a range of 2 nm or less. Here, the pore diameter refers to the crystallographic free diameter of the channels as defined by IZA. The pore diameter means the average diameter of the pores (channels) when the shape is a perfect circle. When the shape of the pores is long in one direction such as an oval, the pore diameter means a shorter diameter.

The exhaust gas purifying composition contains a phosphorus-containing BEA-type zeolite, and the mesopores that cause defects in the framework structure is modified with phosphorus. Therefore, the mesopores have reduced pore diameter to be micropores, and the pore volume of the mesopores contained in the BEA-type zeolite can be reduced. The mesopores contained in the zeolite are considered to cause defects in the framework structure when subjected to severe thermal environments. The phosphorus-containing BEA-type zeolite contained in the exhaust gas purifying composition maintains its framework structure and further improves the heat resistance even when subjected to severe thermal environments, since the mesopores that cause defects in the framework structure are reduced.

Phosphorus generated from the phosphorus source is presumed to be in the form of, for example, phosphate ions, and is presumed to bind more easily to the Lewis acid site, which is a metal ion, than to the Brønsted acid site, in the BEA-type zeolite having a pore volume ratio, V2/V1, of 1.8 or more. Therefore, the phosphorus-containing BEA-type zeolite having a pore volume ratio of 2.0 or more maintains the Brønsted acid site on the surface thereof even when the mesopores are modified with phosphorus to reduce the pore diameter and become micropores. The phosphorus-containing BEA-type zeolite contained in the exhaust gas purifying composition reduces the mesopores that cause heat-induced defects, and maintains its framework structure to adsorb hydrocarbons (HC) in the framework structure even when subjected to severe thermal environments. As for the Brønsted acid site and the Lewis acid site on the surface of the BEA-type zeolite, the presence of each acid site (hydroxyl group (OH)) can be estimated by its infrared absorption spectrum by an infrared spectroscopy (IR) using pyridine as a probe molecule. For example, when the infrared absorption spectrum of the BEA-type zeolite is measured by an infrared spectroscopy (IR) using pyridine as a probe molecule, an absorption band of the probe molecule appears in each different wavenumber region depending on the Brønsted acid site or the Lewis acid site, and an absorption band of the acid site (hydroxyl group (OH group)) further appears in a wavenumber region different from the absorption band of each probe molecule. From the wavenumber regions of the absorption band of the probe molecule and the absorption band of the hydroxyl group (OH group), the Brønsted acid site and the Lewis acid site derived from defects of metal ions or the like can be estimated.

The phosphorus-containing BEA-type zeolite has a pore volume ratio (V2/V1) of the micropore volume V2 having a pore diameter in a range of 2 nm or less as measured by the SF method to the mesopore volume V1 having a pore diameter in a range of 2 nm or more and 100 nm or less as measured by the BJH method, of 2.0 or more. When the pore volume ratio (V2/V1) of the phosphorus-containing BEA-type zeolite is 2.0 or more, the micropore volume V2 becomes large compared to the mesopore volume V1, which reduces the mesopores that cause defects in the framework structure, resulting in that the zeolite can maintain its framework structure even when subjected to severe thermal environments, to further improve the heat resistance. In addition, the phosphorus-containing BEA-type zeolite can adsorb hydrocarbons (HC) in the micropores to maintain high purification performance of hydrocarbons (HC). In the pore volume ratio (V2/V1) of the phosphorus-containing BEA-type zeolite, the micropore volume V2 is preferably large compared to the mesopore volume V1. The pore volume ratio (V2/V1) is preferably 2.2 or more, more preferably 2.4 or more, and even more preferably 2.5 or more. The upper limit of the pore volume ratio (V2/V1) is not particularly limited, but from the viewpoint of maintaining the strength of the BEA-type zeolite, the pore volume ratio (V2/V1) may be 10 or less, may be 6.5 or less, and may be 4.0 or less.

The mesopore volume V1 is the total volume of pores having a pore diameter in a range of 2 nm or more and 100 nm or less, calculated from the nitrogen adsorption isotherm by the Barrett-Joyner-Halenda (BJH) method described in ISO 15901-2.

The micropore volume V2 is the total volume of pores having a pore diameter in a range of 0 nm or more and 2 nm or less, calculated from the nitrogen adsorption isotherm by the Saito-Foley (SF) method using the constants described in ISO 15901-3 (JIS Z8831-3). When measuring the mesopore volume V1 and the micropore volume V2, in order to eliminate adsorbed volatile substances such as water or organic substances attached in advance, the sample to be measured is subjected to a pretreatment of vacuum evacuation while heating under the conditions in Examples described later.

The micropore volume V2 of the phosphorus-containing BEA-type zeolite is preferably in a range of 0.1 $cm^3/g$ or more and 0.3 $cm^3/g$ or less, more preferably in a range of 0.12 $cm^3/g$ or more and 0.29 $cm^3/g$ or less, even more preferably in a range of 0.15 cm$^3$/g or more and 0.28 cm$^3$/g or less, and particularly preferably in a range of 0.16 cm$^3$/g or more and 0.28 cm$^3$/g or less. When the micropore volume V2 of the phosphorus-containing BEA-type zeolite falls within the range of 0.1 cm$^3$/g or more and 0.3 cm$^3$/g or less, the pore volume ratio (V2/V1) of the micropore volume to the mesopore volume is 2.0 or more, and the micropore volume can be sufficiently large relative to the mesopore volume. When the micropore volume V2 of the phosphorus-containing BEA-type zeolite falls within the range of 0.1 cm$^3$/g or more and 0.3 cm$^3$/g or less, hydrocarbons (HC) can be efficiently adsorbed in the micropores to oxidize and purify the hydrocarbons (HC).

The mesopore volume V1 of the phosphorus-containing BEA-type zeolite is preferably in a range of 0.001 cm$^3$/g or more and 0.08 cm$^3$/g or less, more preferably 0.075 cm$^3$/g or less, even more preferably 0.070 cm$^3$/g or less, and particularly preferably 0.065 cm$^3$/g or less. The mesopore volume V1 of the phosphorus-containing BEA-type zeolite is preferably small, but may include mesopores having a volume of 0.001 cm$^3$/g or more since it is difficult to form a BEA-type zeolite having no mesopores. In the phosphorus-containing BEA-type zeolite according to the present embodiment having a pore volume ratio, V2/V1, of 2.0 or more, the mesopores are modified with phosphorus, and thus the mesopore volume can be made smaller to 0.08 cm$^3$/g or less.

The molar ratio of P/Al, which is the molar ratio of phosphorus to aluminum in the phosphorus-containing BEA-type zeolite, is preferably in a range of 0.7 or more and 1.0 or less. When the molar ratio of P/Al, which is the molar ratio of phosphorus (P) to Al as the T atom (central atom) of the TO$_4$ units forming the framework structure of the BEA-type zeolite, falls within the range of 0.7 or more and 1.0 or less, the Lewis acid site formed by Al is modified with phosphorus contained in the BEA-type zeolite, and the Brønsted acid site serving as an active site for oxidation of adsorbed hydrocarbons (HC) is maintained, so that the mesopores, which cause defects in the framework structure, can be reduced while maintaining the purification performance, and the BEA-type zeolite can maintain its framework structure even when subjected to severe thermal environments to further improve the heat resistance. When the molar ratio of P/Al in the phosphorus-containing BEA-type zeolite is larger than 1, the phosphorus content becomes larger, and the Brønsted acid site serving as an active site for oxidation reaction of hydrocarbons may also be modified with phosphorus, resulting in that the number of active sites may decrease and it may be difficult to maintain the purification performance. The amount of aluminum (Al) and phosphorus (P) in the phosphorus-containing BEA-type zeolite can be calculated from the measured values obtained by measuring the amount of aluminum (Al) and phosphorus (P) in the phosphorus-containing BEA-type zeolite using a fluorescent X-ray analyzer (for example, manufactured by Rigaku Corp.) as a composition analyzer according to the method in Examples described later.

The molar ratio of SiO$_2$/Al$_2$O$_3$ in the phosphorus-containing BEA-type zeolite is preferably in a range of 10 or more and 100 or less, more preferably in a range of 20 or more and 90 or less, and even more preferably in a range of 25 or more and 80 or less. When the molar ratio of SiO$_2$/Al$_2$O$_3$ in the phosphorus-containing BEA-type zeolite falls within the range of 10 or more and 100 or less, a high degree of balance between maintaining the skeletal structure of the BEA-type zeolite when subjected to severe thermal environments and high adsorption capacity for hydrocarbons (HC), can be achieved. In addition, when the molar ratio of SiO$_2$/Al$_2$O$_3$ in the phosphorus-containing BEA-type zeolite falls within the range of 10 or more and 100 or less, the Brønsted acid site serving as an active site for oxidation reaction when purifying adsorbed hydrocarbons (HC) is sufficiently provided. The molar ratio of SiO$_2$/Al$_2$O$_3$ in the phosphorus-containing BEA-type zeolite can be calculated from the measured values obtained by measuring the amount of aluminum (Al) and silicon (Si) in the phosphorus-containing BEA-type zeolite using a fluorescent X-ray analyzer (for example, manufactured by Rigaku Corp.) as a composition analyzer according to the method in Examples described later.

Next, an example of the production method for an exhaust gas purifying composition will be described. The production method for an exhaust gas purifying composition is not limited to the example described below.

The production method for an exhaust gas purifying composition containing a phosphorus-containing BEA-type zeolite includes: a step of preparing a BEA-type zeolite having a ratio (V2/V1) of a micropore volume V2 having a pore diameter in a range of 2 nm or less to a mesopore volume V1 having a pore diameter in a range of 2 nm or more and 100 nm or less as measured by the BJH method of 1.8 or more; a step of bringing the BEA-type zeolite into contact with a phosphorus-containing compound to attach the phosphorus-containing compound to the BEA-type zeolite; and a step of heat-treating the BEA-type zeolite containing the phosphorus-containing compound to obtain a phosphorus-containing BEA-type zeolite.

Step of Preparing BEA-Type Zeolite

As the BEA-type zeolite, a BEA-type zeolite having a pore volume ratio (V2/V1) of a micropore volume V2 having a pore diameter in a range of 2 nm or less to a mesopore volume V1 having a pore diameter in a range of 2 nm or more and 100 nm or less as measured by the BJH method of 1.8 or more is prepared. The pore volume ratio (V2/V1) of the BEA-type zeolite to be prepared is preferably 2.0 or more, more preferably 2.2 or more, even more preferably 2.4 or more, and particularly preferably 2.5 or more. The pore volume ratio (V2/V1) of the BEA-type zeolite to be prepared may be 8.0 or less, and may be 7.0 or less. When the BEA-type zeolite, in which phosphorus is to be contained, has a pore volume ratio (V2/V1) of 1.8 or more, the mesopores are modified with phosphorus, and the pore diameter of the mesopores is reduced to form micropores, so that the mesopores, which cause defects in the framework structure, can be reduced to further improve the heat resistance. The BEA-type zeolite may be dried before being brought into contact with a phosphorus-containing compound. When drying the BEA-type zeolite, the drying temperature can be in a range of 80° C. or higher and 200° C. or lower, and the drying time can be in a range of 0.5 hour or more and 5 hours or less. The pressure at the time of drying is not particularly limited, and may be an atmospheric pressure (0.1 MPa) or under reduced pressure of 0.1 MPa or less.

Step of Attaching Phosphorus-Containing Compound

Examples of the method of bringing the BEA type zeolite into contact with a phosphorus-containing compound to attach the phosphorus-containing compound to the BEA-type zeolite include a vapor deposition method, an impregnation method, a precipitation method, and an ion exchange method. Examples of the vapor deposition method include a method of placing the BEA-type zeolite and a phosphorus-containing compound into a container and evaporating the phosphorus-containing compound at room temperature or by heating to be attached to the BEA-type zeolite. Examples of the impregnation method include a method of immersing the BEA-type zeolite into a solution obtained by mixing a phosphorus-containing compound with a solvent, and heating and drying the mixed solution under normal pressure or reduced pressure to attach the phosphorus-containing compound to the BEA-type zeolite. Here, the phosphorus-containing compound attached to the BEA-type zeolite may be phosphorus or phosphorus-containing ions. Examples of the impregnation method include an incipient wetness method, an evaporation-drying method, a pore-filling method, a spraying method, and an equilibrium adsorption method. Examples of the precipitation method include a kneading method and a deposition method.

When attaching phosphorus to the BEA-type zeolite by the vapor deposition method, examples of the phosphorus-containing compound include trimethyl phosphate, triethyl phosphate, trimethyl phosphite, and triethyl phosphite. Among them, trimethyl phosphate is preferred from the viewpoint of low boiling point. When attaching phosphorus to the BEA-type zeolite by the impregnation method, the phosphorus-containing compound is preferably water-soluble, and examples thereof include: dihydrogen phosphates such as trimethyl phosphate, triethyl phosphate, trimethyl phosphite, triethyl phosphite, phosphoric acid, ammonium dihydrogen phosphate, sodium dihydrogen phosphate, and potassium dihydrogen phosphate; and hydrogen phosphates such as diammonium hydrogen phosphate and dipotassium hydrogen phosphate. Examples of the phosphoric acid include orthophosphoric acid ($H_3PO_4$), pyrophosphoric acid ($H_4P_2O_7$), triphosphoric acid ($H_5P_3O_{10}$), polyphosphoric acid, metaphosphoric acid ($HPO_3$), and ultraphosphoric acid. From the viewpoint of ease of drying, phosphoric acid such as orthophosphoric acid, trimethyl phosphate, ammonium phosphates such as ammonium dihydrogen phosphate and diammonium hydrogen phosphate are preferred. Examples of the solvent to be mixed with the phosphorus-containing compound include polar organic solvents such as deionized water, ethanol, isopropyl alcohol, and acetone. From the viewpoint of ease of handling and drying, it is preferable to use deionized water or ethanol. The content of the phosphorus-containing compound may be in a range of 1% by mass or more and 25% by mass or less, may be in a range of 2% by mass or more and 20% by mass or less, and may be in a range of 5% by mass or more and 15% by mass or less, relative to 100% by mass of the total amount of the mixed solution. When attaching the phosphorus-containing compound to the BEA-type zeolite by the impregnation method, the time for impregnating the BEA-type zeolite in the mixed solution can be in a range of 0.5 hour or more and 2 hours or less. After impregnation, the BEA-type zeolite containing the phosphorus-containing compound may be dried. The drying temperature can be in a range of 80° C. or higher and 200° C. or lower, and the drying time can be in a range of 0.5 hour or more and 5 hours or less. The pressure at the time of drying is not particularly limited, and may be an atmospheric pressure (0.1 MPa) or under reduced pressure of 0.1 MPa or less.

Heat Treatment Step

The phosphorus-containing compound is attached to the BEA-type zeolite by the vapor deposition method or the impregnation method, and then heat-treated to obtain a phosphorus-containing BEA-type zeolite. The heat treatment temperature is preferably in a range of 200° C. or higher and 800° C. or lower, and more preferably in a range of 400° C. or higher and 700° C. or lower, in order to maintain the framework structure of the BEA-type zeolite and to modify the mesopores with phosphorus. The atmosphere for heat treatment may be an atmospheric atmosphere or an atmosphere of an inert gas such as nitrogen.

By heat-treating the BEA-type zeolite attached with the phosphorus-containing compound, the mesopores are modified with phosphorus to reduce the pore diameter to be micropores, so that the mesopores that cause defects in the framework structure can be reduced to further improve the heat resistance.

The phosphorus-containing BEA-type zeolite thus obtained has a pore volume ratio (V2/V1) of the micropore volume V2 having a pore diameter in a range of 2 nm or less, as measured by the SF method, to the mesopore volume V1 having a pore diameter in a range of 2 nm or more and 100 nm or less, as measured by the BJH method, of 2.0 or more, and the micropore volume V2 is larger than the mesopore volume V1. Therefore, the phosphorus-containing BEA-type zeolite reduces the mesopores that cause defects in the framework structure, and maintains the framework structure even when subjected to severe thermal environments to further improve the heat resistance.

The exhaust gas purifying composition containing the phosphorus-containing BEA-type zeolite thus obtained maintains the framework structure of the BEA-type zeolite and exhibits stable adsorption capacity for hydrocarbons (HC) even when exposed to a high temperature in a temperature range of 900° C. or higher and 1,100° C. or lower, for example, 900° C. or higher and 1,000° C. or lower, since the mesopores that cause defects in the framework structure are reduced. Furthermore, the phosphorus-containing BEA-type zeolite contained in the exhaust gas purifying composition maintains the Brønsted acid site serving as an active site for oxidation reaction of the adsorbed hydrocarbons (HC) even when modified with phosphorus, and thus the exhaust gas purifying composition exhibits stable and high purification performance even when exposed to a high temperature in a temperature range of 900° C. or higher and 1,100° C. or lower. Such an exhaust gas purifying composition is capable of exhibiting stable and high exhaust gas purification performance as an exhaust gas purifying catalyst for internal-combustion engines powered by fossil fuel, such as gasoline engines and diesel engines. In particular, the exhaust gas purifying composition according to the present embodiment can be suitably used for purifying exhaust gases emitted from internal-combustion engines of automatic four-wheel vehicles and motorcycles owing to its high heat resistance. The exhaust gas purifying composition according to the present embodiment is effectively used for purifying, especially, hydrocarbons (HC) in the exhaust gases. The exhaust gas purifying composition according to the present embodiment can be suitably used for purifying hydrocarbons (HC) contained in the exhaust gases flowing through the exhaust passage of an internal combustion engine, and can also provide an exhaust gas purification method.

The exhaust gas purifying composition may be an exhaust gas purifying composition composed of the phosphorus-containing BEA-type zeolite having a pore volume ratio (V2/V1) of 2.0 or more, and may contain other components other than the phosphorus-containing BEA-type zeolite. Examples of the other components include conventionally known catalyst materials other than the phosphorus-containing BEA-type zeolite contained in the exhaust gas purifying composition according to the present embodiment.

The exhaust gas purifying composition may be in any form such as powder, paste, or granule. For example, the exhaust gas purifying composition according to the present embodiment can be used as a catalyst layer formed on a catalyst support. As the catalyst support, for example, a support made of ceramics or a metal material can be used. Examples of the ceramics used as the catalyst support include alumina ($Al_2O_3$), mullite ($3Al_2O_3$-$2SiO_2$), cordierite ($2MgO$-$2Al_2O_3$-$5SiO_2$), aluminum titanate ($Al_2TiO_5$), and silicon carbide (SiC). Examples of the metal material used as the catalyst support include stainless steel. The shape of the catalyst support is not particularly limited, and examples thereof include a honeycomb shape, a plate shape, and a pellet shape.

A catalyst structural body using the exhaust gas purifying composition according to the present embodiment as a catalyst layer may include a catalyst layer composed of a conventionally known catalyst material other than the exhaust gas purifying composition according to the present embodiment. The catalyst structural body using the catalyst layer formed on the catalyst support can be used for DPF (Diesel Particulate Filter) and GPF (Gasoline Particulate Filter) as a catalyst structural body having the catalyst layer formed on the catalyst support by using the exhaust gas purifying composition according to the present embodiment.

Hereinafter, the present invention will be described in more detail with reference to Examples and Comparative Examples. The present invention is not limited to these Examples.

Example 1

A protonated BEA-type zeolite a that was dried at 150° C. for 8 hours in an atmospheric atmosphere of 0.1 MPa was prepared. The molar ratio of $SiO_2/Al_2O_3$ of the protonated BEA-type zeolite a, as measured by the method described later, was 37.5, and the pore volume ratio, V2/V1, was 2.9. A phosphorus-containing compound was attached to the prepared protonated BEA-type zeolite a by the vapor deposition method. Specifically, 3.00 g (dry weight) of the dried protonated BEA-type zeolite and 0.31 g of 99% by mass trimethyl phosphate were put into a sealed container, depressurized to 0.1 MPa, and then left to stand at 80° C. for 8 hours to obtain a BEA-type zeolite vapor-deposited with the phosphorus-containing compound. The resulting BEA-type zeolite powder containing the phosphorus-containing compound was dried at 120° C. for 2 hours in an atmospheric atmosphere of 0.1 MPa. The dried BEA-type zeolite powder containing the phosphorus-containing compound was heat-treated at 600° C. for 3 hours in an atmospheric atmosphere of 0.1 MPa to produce a phosphorus-containing BEA-type zeolite powder, thereby obtaining an exhaust gas purifying composition composed of the phosphorus-containing BEA-type zeolite.

Example 2

A phosphorus-containing BEA-type zeolite powder was produced in the same manner as in Example 1, except that the amount of trimethyl phosphate used was changed to 0.37 g, thereby obtaining an exhaust gas purifying composition composed of the phosphorus-containing BEA-type zeolite.

Example 3

A protonated BEA-type zeolite a that was dried at room temperature for 8 hours in an atmospheric atmosphere of 0.1 MPa was prepared. A phosphorus-containing compound was attached to the prepared protonated BEA-type zeolite a by the incipient wetness method. Specifically, 3.00 g (dry weight) of the prepared protonated BEA-type zeolite was impregnated into a mixed solution in which 0.26 g of trimethyl phosphate was dissolved in 2.7 mL of deionized water as a solvent, and dried at 120° C. for 2 hours in an atmospheric atmosphere of 0.1 MPa. The solid of the dried BEA-type zeolite attached with the phosphorus-containing compound was heat-treated at 600° C. for 1 hour in an atmospheric atmosphere of 0.1 MPa to obtain a phosphorus-containing BEA-type zeolite solid. The resulting solid was pulverized to produce a phosphorus-containing BEA-type zeolite powder, thereby obtaining an exhaust gas purifying composition composed of the phosphorus-containing BEA-type zeolite powder.

Example 4

A phosphorus-containing compound was attached to the BEA-type zeolite by the incipient wetness method to produce a phosphorus-containing BEA-type zeolite powder in the same manner as in Example 3, except that a mixed solution in which 0.24 g of diammonium hydrogen phosphate was dissolved in 2.7 mL of deionized water was used, thereby obtaining an exhaust gas purifying composition composed of the phosphorus-containing BEA-type zeolite powder.

Example 5

The process was the same as in Example 4, except that the phosphorus-containing compound was attached to the protonated BEA-type zeolite by the evaporation-drying method. Specifically, 3.00 g (dry weight) of the prepared protonated BEA-type zeolite was impregnated and added to a mixed solution in which 0.24 g of diammonium hydrogen phosphate was dissolved in 2.7 mL of deionized water to obtain a BEA-type zeolite slurry. A phosphorus-containing BEA-type zeolite powder was obtained in the same manner as in Example 4, except that the resulting slurry was heated and dried under stirring in a beaker in an atmospheric atmosphere of 0.1 MPa. The phosphorus-containing BEA-type zeolite powder was used as an exhaust gas purifying composition.

Example 6

A protonated BEA-type zeolite a that was dried at 150° C. for 8 hours in an atmospheric atmosphere of 0.1 MPa was prepared. A phosphorus-containing compound was attached to the BEA-type zeolite by the incipient wetness method to produce a phosphorus-containing BEA-type zeolite powder in the same manner as in Example 3, except that a mixed solution in which 0.24 g of 85% orthophosphoric acid was dissolved in 2.7 mL of deionized water was used, thereby obtaining an exhaust gas purifying composition composed of the phosphorus-containing BEA-type zeolite powder.

Example 7

A protonated BEA-type zeolite b that was dried at 150° C. for 8 hours in an atmospheric atmosphere of 0.1 MPa was prepared. The molar ratio of $SiO_2/Al_2O_3$ of the protonated BEA-type zeolite b, as measured by the method described later, was 37.4, and the pore volume ratio, V2/V1, was 6.9. A phosphorus-containing compound was attached to the BEA-type zeolite by the incipient wetness method to produce a phosphorus-containing BEA-type zeolite powder in the same manner as in Example 3, except that the protonated BEA-type zeolite b was used, thereby obtaining an exhaust gas purifying composition composed of the phosphorus-containing BEA-type zeolite powder.

Comparative Example 1

A protonated BEA-type zeolite c that was dried at 150° C. for 8 hours in an atmospheric atmosphere of 0.1 MPa was prepared. The molar ratio of $SiO_2/Al_2O_3$ of the protonated BEA-type zeolite c, as measured by the method described later, was 32.0, and the pore volume ratio, V2/V1, was 1.6. Here, the protonated BEA-type zeolite c was the same as the protonated BEA-type zeolite used in Example 1 of International Publication No. 2018/131195. A phosphorus-containing compound was attached to the BEA-type zeolite by the vapor deposition method to produce a phosphorus-containing BEA-type zeolite powder in the same manner as in Example 1, except that the protonated BEA-type zeolite c was used, thereby obtaining an exhaust gas purifying composition composed of the phosphorus-containing BEA-type zeolite powder.

Comparative Example 2

A phosphorus-containing BEA-type zeolite powder was produced in the same manner as in Comparative Example 1, except that the amount of trimethyl phosphate used was changed to 0.73 g, thereby obtaining an exhaust gas purifying composition composed of the phosphorus-containing BEA-type zeolite powder.

Comparative Example 3

The protonated BEA-type zeolite powder a prepared in Example 1 without containing phosphorus was used as an exhaust gas purifying composition.

Comparative Example 4

The protonated BEA-type zeolite powder b prepared in Example 7 without containing phosphorus was used as an exhaust gas purifying composition.

Comparative Example 5

The protonated BEA-type zeolite powder c prepared in Comparative Example 1 without containing phosphorus was used as an exhaust gas purifying composition.

The protonated BEA-type zeolite and the exhaust gas purifying composition prepared in each of Examples and Comparative Examples were evaluated as follows. The results are shown in Table 1. In Table 1, the vapor deposition method is described as "VD", the incipient wetness method is described as "IW", and the evaporation-drying method is described as "DU".

Molar Ratio of $SiO_2/Al_2O_3$

The amounts of Si and Al in the BEA-type zeolite and the exhaust gas purifying composition were measured using a scanning fluorescent X-ray analyzer (model number: ZSX Primus II, manufactured by Rigaku Corp.), and the molar ratio of $SiO_2/Al_2O_3$ was calculated from the obtained Si and Al amounts. The method for preparing a measurement sample was as follows.

Method for Preparing Measurement Sample

The measurement sample was prepared by filling the BEA-type zeolite or the exhaust gas purifying composition into a vinyl chloride tube having a diameter of 30 mm, and compression molding.

Molar Ratio of P/Al

The amounts of P and Al in the BEA-type zeolite and the exhaust gas purifying composition were measured using a scanning fluorescent X-ray analyzer (model number: ZSX Primus II, manufactured by Rigaku Corp.), and the molar ratio of P/Al was calculated from the obtained P and Al amounts. The method for preparing a measurement sample was as follows.

Method for Preparing Measurement Sample

The measurement sample was prepared by filling the BEA-type zeolite or the exhaust gas purifying composition into a vinyl chloride tube having a diameter of 30 mm, and compression molding.

Mesopore Volume V1 and Micropore Volume V2

Nitrogen Adsorption Isotherm Measurement

The mesopore volume V1 and the micropore volume V2 were calculated from the nitrogen adsorption isotherm.

The nitrogen adsorption isotherm of the BEA-type zeolite or the exhaust gas purifying composition was measured by the volumetric method using a high-precision gas/vapor adsorption measurement apparatus (model number: BEL-SORP-max II, manufactured by MicrotracBEL Corp.) with high-purity nitrogen gas adsorbed on the sample at 77 K. The measurement sample was weighed in a sample tube in an amount of 0.1 to 0.2 g in terms of dry weight. For the pre-measurement treatment, vacuum exhaust ($1 \times 10^{-5}$ kPa) was performed at 510° C. for 8 hours or more. The nitrogen adsorption isotherm was measured starting from a relative pressure ($P/P_0$) of 10.5 or less.

Measurement Method for Mesopore Volume V1

Figure 1:
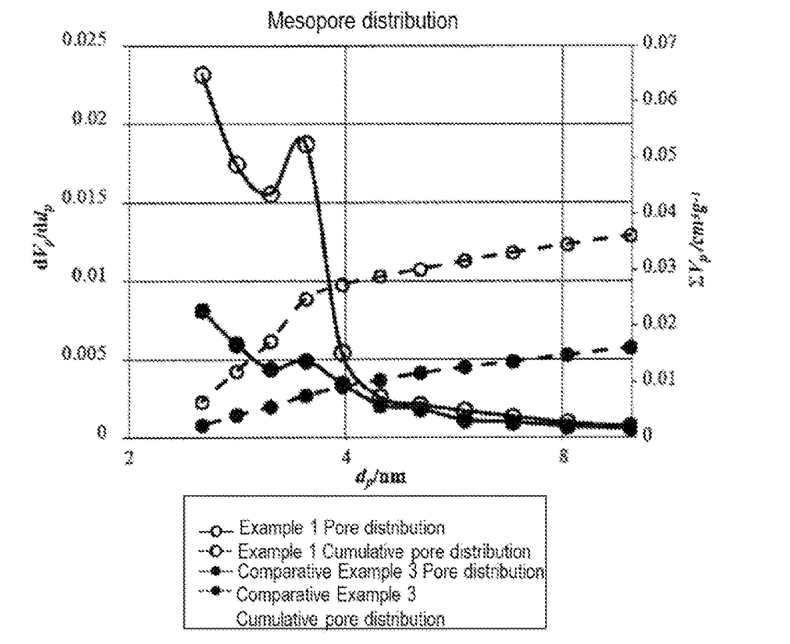
FIG. 1 is a graph showing pore distributions and cumulative pore distributions of exhaust gas purifying compositions according to Example 1 and Comparative Example 3, obtained through the measurements by the BJH method.

The mesopore volume V1 was calculated from the obtained nitrogen adsorption isotherm measured by the method for determining the mesopore distribution by Barrett, Joyner, and Halenda (BJH method) described in ISO 15901-2. The desorption curve was used for the calculation, and the adsorption cross-sectional area of the nitrogen molecule was calculated as 0.1620 $nm^2$. The pore volume having a pore diameter in a range of 2 nm or more and 100 nm or less was defined as the mesopore volume V1. As for the exhaust gas purifying compositions in Example 1 and Comparative Example 3, a graph of the pore distributions and the cumulative pore distributions obtained through the measurements by the BJH method is shown in FIG. 1. In the graph, the left vertical axis shows the pore area distribution, and the right vertical axis shows the cumulative pore surface volume of pores of 2 nm or more.

Measurement Method for Micropore Volume V2

The micropore volume V2 was obtained by calculating the micropore distribution and the volume from the measured nitrogen adsorption isotherm, according to the SF method (Saito-Foley method) (A. Saito, H. C. Foley, Microporous Materials, 3 (1995) 531). As the physical constants, adsorbent, and adsorbent gas parameters used for calculating the micropore volume, the constants described in Physical Parameters for Micropore Size Calculation (ISO 15901-3, JIS Z8831-3) were used. The adsorption cross-sectional area of the nitrogen molecule was calculated as 0.1620 $nm^2$. The pore volume having a pore diameter in a range of 0 nm or more and 2 nm or less was defined as the micropore volume V2.

BET Specific Surface Area

The specific surface area was calculated by the BET method from the nitrogen adsorption isotherm measured in accordance with ISO 9277 (JIS Z8330: 2013).

Thermal Durability Test

The exhaust gas purifying composition in each of Examples and Comparative Examples was subjected to a thermal durability test at 1,000° C. for 25 hours in a 10% by volume of H₂O atmosphere with the following cycle.

Cycle: A model gas having the following composition and air were alternately flowed, respectively at a flow rate of 3 L/min for 80 seconds and at a flow rate of 3 L/min for 20 seconds.

Model gas composition: 70 mL/min of $C_3H_6$, 70 mL/min of $O_2$, and the balance of $N_2$.

The model gas and air were mixed with water vapor vaporized from a water-containing tank so as to have 10% by volume of $H_2O$, respectively. The saturated water vapor pressure was adjusted according to the temperature to achieve the above volume percent water vapor amount.

Specific Surface Area Retention Rate

The BET specific surface areas of the exhaust gas purifying composition before and after the thermal durability test were measured, and the ratio of the BET specific surface area after the thermal durability test to the BET specific surface area before the thermal durability test was determined as the BET specific surface area retention rate. Specifically, the BET specific surface area retention rate was calculated by the following formula (1):

Specific surface area retention rate (%)=(BET specific surface area after thermal durability test/BET specific surface area before thermal durability test)×100. (1)

XRD Retention Rate

The X-ray diffraction spectrum of each of the exhaust gas purifying compositions before and after the thermal durability test was measured using an X-ray diffractometer (model number: MiniFlex600, manufactured by Rigaku Corp.). The peak intensity of the strongest peak in the vicinity of the diffraction angle 2θ of 22.4° in the X-ray diffraction spectrum of each of the exhaust gas purifying compositions before and after the thermal durability test was defined as the XRD crystallinity, and the XRD retention rate was calculated by the following formula (2):

XRD retention rate=(XRD crystallinity after thermal durability test/XRD crystallinity before thermal durability test)×100. (2)

Toluene Adsorption Performance

First, 200 mg of each of the exhaust gas purifying compositions before and after the thermal durability test was filled in a flow reactor, and the evaluation gas having the following composition was circulated at 50° C. in a flow rate of 30 L/min for 30 minutes to adsorb toluene. The toluene was desorbed by a thermal desorption method, and the amount of the toluene desorbed was measured by a mass spectrometer. The amount of toluene adsorbed of each arbitrary unit is shown in Table 1 when the amount in the exhaust gas purifying composition after the thermal durability test in Comparative Example 3 is set to 1.0. The thermal desorption of toluene was measured using a catalyst evaluation system (BELCAT and BELMASS) manufactured by MicrotracBEL Corp., and the desorbed toluene amount (that is, the amount of toluene adsorbed in the exhaust gas purifying composition) was measured using ChemMaster manufactured by MicrotracBEL Corp. The toluene adsorption performance was measured only on the exhaust gas purifying compositions in Examples 1, 4, 7 and Comparative Examples 1 to 4.

Evaluation Gas Composition: 0.1% by Volume of Toluene, 99.9% by Volume of Helium

TABLE 1

| | Production conditions | | | | | | | Evaluations | |
|---|---|---|---|---|---|---|---|---|---|
| | BEA-type zeolite | | | | | | | Before thermal durability test | |
| | | | Meso-pore | Micro-pore | Pore | Phosphorus modification method | | BET specific | Meso-pore |
| | BEA-type zeolite | $SiO_2/Al_2O_3$ molar ratio | volume V1 (cm³/g) | volume V2 (cm³/g) | volume ratio V2/V1 | Phosphorus-containing compound | Attaching method | P/Al molar ratio | surface area (m²/g) | volume V1 (cm³/g) |
| Example 1 | a | 37.5 | 0.068 | 0.20 | 2.9 | Trimethyl phosphate | VD | 0.85 | 595.1 | 0.035 |
| Example 2 | | | | | | | | 1.00 | 541.3 | 0.055 |
| Example 3 | | | | | | | IW | 0.70 | 556.3 | 0.061 |
| Example 4 | | | | | | Diammonium hydrogen phosphate | IW | 0.70 | 494.1 | 0.049 |
| Example 5 | | | | | | | DU | 0.70 | 469.1 | 0.046 |
| Example 6 | | | | | | Orthophosphoric acid | IW | 0.80 | 602.9 | 0.057 |
| Example 7 | b | 37.4 | 0.035 | 0.24 | 6.9 | Trimethyl phosphate | IW | 1.00 | 578.8 | 0.062 |
| Comparative Example 1 | c | 32.0 | 0.145 | 0.24 | 1.6 | Trimethyl phosphate | VD | 0.80 | 596.5 | 0.131 |
| Comparative Example 2 | | | | | | Trimethyl phosphate | VD | 2.00 | 459.8 | 0.103 |
| Comparative Example 3 | a | 37.5 | 0.068 | 0.20 | 2.9 | — | — | — | 591.0 | 0.068 |
| Comparative Example 4 | b | 37.4 | 0.035 | 0.24 | 6.9 | — | — | — | 710.2 | 0.035 |
| Comparative Example 5 | c | 32.0 | 0.145 | 0.24 | 1.6 | — | — | — | 681.7 | 0.145 |

TABLE 1-continued

| | | Before thermal durability test | | | After thermal durability test | | | |
|---|---|---|---|---|---|---|---|---|
| | | Micropore volume V2 (cm³/g) | Pore volume ratio V2/V1 | Toluene adsorption amount | BET specific surface area (m²/g) | Specific surface area retention rate (%) | XRD retention rate (%) | Toluene adsorption amount |
| | Example 1 | 0.21 | 6.0 | 41.1 | 434 | 73 | 78 | 15.9 |
| | Example 2 | 0.20 | 3.6 | — | 369 | 68 | 72 | — |
| | Example 3 | 0.16 | 2.6 | — | 462 | 83 | 73 | — |
| | Example 4 | 0.17 | 3.5 | 37.5 | 390 | 79 | 84 | 23.5 |
| | Example 5 | 0.16 | 3.5 | — | 303 | 65 | 70 | — |
| | Example 6 | 0.21 | 3.7 | — | 432 | 72 | 80 | — |
| | Example 7 | 0.20 | 3.2 | 35.3 | 399 | 69 | 76 | 5.1 |
| | Comparative Example 1 | 0.21 | 1.6 | 1.8 | 284 | 48 | 65 | 1.0 |
| | Comparative Example 2 | 0.16 | 1.4 | 2.3 | 10.0 | 2 | 0 | — |
| | Comparative Example 3 | 0.20 | 2.9 | 48.7 | 60.8 | 10 | 30 | 1.0 |
| | Comparative Example 4 | 0.24 | 6.9 | 35.3 | 63.7 | 9 | 33 | — |
| | Comparative Example 5 | 0.24 | 1.6 | — | 19.3 | 3 | 0 | — |

As shown in Table 1, the exhaust gas purifying composition in each of Examples 1 to 7 had a specific surface area retention rate of 65% or more and an XRD retention rate of 70% or more. From the results, it can be confirmed that the framework structure of the phosphorus-containing BEA-type zeolite was maintained even after the thermal durability test, and the formation of defects in the framework structure was suppressed. Practically, the amount of toluene adsorbed in the exhaust gas purifying composition before the thermal durability test in each of Examples 1, 4, and 7 was larger than that in Comparative Example 1 but smaller than that in Comparative Example 3. However, the toluene adsorption performance after the thermal durability test in each of Examples 1, 4, and 7 was superior to that in Comparative Examples 1 and 3.

In each of Examples 1 to 6, the mesopore volume V1 was more reduced after being modified with phosphorus than before. It is presumed that, in Example 7, the mesopore volume of the BEA-type zeolite before containing phosphorus was small, and thus the framework structure was slightly defective and the mesopore volume was increased by attaching the phosphorus-containing compound to the BEA-type zeolite and then heat-treating. However, in Example 7, since the pore volume ratio (V2/V1) was 2.0 or more, the formation of defects in the framework structure after the thermal durability test was suppressed.

The phosphorus-containing BEA-type zeolite in each of Comparative Examples 1 and 2 had a pore volume ratio (V2/V1) of less than 2.0, and the mesopores that caused defects in the framework structure were not sufficiently reduced, resulting in that the specific surface area retention rate and the XRD retention rate after the thermal durability test were low, and the framework structure was defective. The BEA-type zeolite in each of Comparative Examples 3 to 5 did not contain phosphorus, and thus the specific surface area retention rate and the XRD retention rate after the thermal durability test were very low and the framework structure was defective even when the pore volume ratio (V2/V1) was 2.0 or more.

INDUSTRIAL APPLICABILITY

The exhaust gas purifying composition according to the present disclosure is capable of maintaining the purification performance of hydrocarbons (HC) even when subjected to severe thermal environments, and further improving the heat resistance. Thus, the exhaust gas purifying composition according to the present disclosure can be suitably used for purifying exhaust gases emitted from internal-combustion engines of automatic four-wheel vehicles, motorcycles, and the like.

The invention claimed is:

1. An exhaust gas purifying composition, comprising a phosphorus-containing BEA-type zeolite,
   the phosphorus-containing BEA-type zeolite having a pore volume ratio (V2/V1) of a micropore volume V2 to a mesopore volume V1 of 2.0 or more,
   wherein the micropore volume V2 has a pore diameter in a range of 2 nm or less as measured by a Saito-Foley (SF) method, and the mesopore volume V1 has a pore diameter in a range of 2 nm or more and 100 nm or less as measured by a Barrett-Joyner-Halenda (BJH) method, and
   wherein the phosphorus-containing BEA-type zeolite has a molar ratio of $SiO_2/Al_2O_3$ in a range of 10 or more and 100 or less.

2. The exhaust gas purifying composition according to claim 1, wherein the phosphorus-containing BEA-type zeolite has a micropore volume V2 in a range of 0.1 cm³/g or more and 0.3 cm³/g or less.

3. The exhaust gas purifying composition according to claim 2, wherein the phosphorus-containing BEA-type zeolite has a mesopore volume V1 in a range of 0.001 cm³/g or more and 0.08 cm³/g or less.

4. The exhaust gas purifying composition according to claim 1, wherein the phosphorus-containing BEA-type zeolite has a mesopore volume V1 in a range of 0.001 cm³/g or more and 0.08 cm³/g or less.

5. The exhaust gas purifying composition according to claim 1, wherein the phosphorus-containing BEA-type zeolite has a molar ratio of P/Al in a range of 0.7 or more and 1.0 or less.

6. A production method for an exhaust gas purifying composition,
the exhaust gas purifying composition comprising a phosphorus-containing BEA-type zeolite,
the production method comprising:
a step of preparing a BEA-type zeolite having a pore volume ratio (V2/V1) of a micropore volume V2 to a mesopore volume V1 of 1.8 or more;
a step of bringing the BEA-type zeolite into contact with a phosphorus-containing compound to attach the phosphorus-containing compound to the BEA-type zeolite; and
a step of heat-treating the BEA-type zeolite containing the phosphorus-containing compound to obtain a phosphorus-containing BEA-type zeolite, the phosphorus-containing BEA-type zeolite having the pore volume ratio (V2/V1) of the micropore volume V2 to the mesopore volume V1 of 2.0 or more,
wherein the micropore volume V2 has a pore diameter in a range of 2 nm or less as measured by the SF method, and the mesopore volume V1 has a pore diameter in a range of 2 nm or more and 100 nm or less as measured by the BJH method, and
wherein the phosphorus-containing BEA-type zeolite has a molar ratio of $SiO_2/Al_2O_3$ in a range of 10 or more and 100 or less.

7. The production method for an exhaust gas purifying composition according to claim 6, wherein the phosphorus-containing compound comprises at least one selected from the group consisting of phosphoric acid, trimethyl phosphate, ammonium dihydrogen phosphate, and diammonium hydrogen phosphate.

8. The production method for an exhaust gas purifying composition according to claim 7, wherein the heat treatment is performed at a temperature in a range of 200° C. or higher and 800° C. or lower.

9. The production method for an exhaust gas purifying composition according to claim 6, wherein the heat treatment is performed at a temperature in a range of 200° C. or higher and 800° C. or lower.

* * * * *